Sept. 30, 1924.

H. SCHMIDT

GUIDE

Filed Dec. 14, 1921

INVENTOR.
HELLMUTH SCHMIDT
BY M. C. Frank
ATTORNEY

Sept. 30, 1924.

H. SCHMIDT

GUIDE

Filed Dec. 14, 1921

INVENTOR.
HELLMUTH SCHMIDT
BY M. C. Frank
ATTORNEY

Sept. 30, 1924.

H. SCHMIDT 1,510,110

GUIDE

Filed Dec. 14, 1921

INVENTOR.
HELLMUTH SCHMIDT
BY M. C. Frank
ATTORNEY

Patented Sept. 30, 1924.

1,510,110

UNITED STATES PATENT OFFICE.

HELLMUTH SCHMIDT, OF OAKLAND, CALIFORNIA.

GUIDE.

Application filed December 14, 1921. Serial No. 522,309.

*To all whom it may concern:*

Be it known that I, HELLMUTH SCHMIDT, a citizen of the United States, residing at 3754 Emerson Street, Oakland, in the county of Alameda and State of California, have invented certain new and useful Improvements in Guides, of which the following is a specification.

This invention relates to guides, showing data thereon and adapted to receive data, to lead one to a desired goal, and is for use for travellers, business men and others.

In its main features, the invention comprises preferably a book consisting of a series of plans or maps, and a translucent sheet adapted to receive erasable marks. The latter being hinged to an edge of the book, so that the sheet may be superposed on any one of the plans or maps, for marking thereon any data desired to be transferred from any one or more of the said maps.

For illustration, assume the case of a city guide. A number of skeleton maps of the city are provided. Each leaf in the body of the guide has the same skeleton map printed therein, and is so positioned with respect to the others that all the maps will register when the leaves are bound together; therefore, the North arrows on the maps will all point in the same direction.

Along one or more margins of a page, may be printed the street names, points of interest, or other data desired to be emphasized by that particular page. For example, a margin of said page may have all the streets beginning with the letter A printed thereon, and with a light line running from each street name to the location of the street designated by that name, and the next leaf may have all the streets beginning with B and successive letter if the remaining marginal space permits. Upon another skeleton map of the said city, may be marked or printed, some or all of the street-car or transportation lines; upon another, theatres or other places of amusement; upon another, hotels; upon another, prominent stores; and so on to any desired number, and any desired matters of interest to a user of the guide. All of these data leaves are hinged or bound along one edge, like the leaves of a book, and preferably, opposing them is hinged, or bound, the said transfer sheet, which may be superposed upon any one of the data leaves for tracing purposes as stated above. Hence a user of the guide desiring to reach any point or object in the city, will superpose the transfer sheet upon the page showing that point or object, and mark on said sheet, as with a pencil, the said point; and turning to the page showing the position at which he may find himself at the moment, he then superposes the transfer sheet on said latter page and similarly marks on the transfer sheet his location point. He then may superpose the transfer sheet on the leaf showing the transportation system, and trace thereon the shortest or chosen route between the two points which he must follow to reach the desired point or object. Other uses of the transfer sheet will readily suggest themselves from the above example.

Having completed the immediate purpose, the marks on the transfer sheet may be erased, and the sheet is then ready for use for another occasion.

On the accompanying three sheets of drawings, I have illustrated a guide designed for city use, that being one of the most frequent uses to which my invention may be put.

Figure 1:
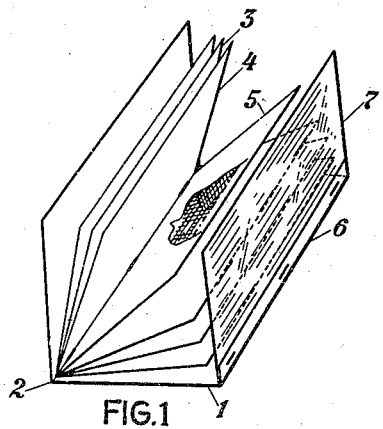
Figure 1 is a perspective view of the guide, partly open and showing some of the data leaves and the transfer sheet hinged to the back cover of the guide.
Figure 2:
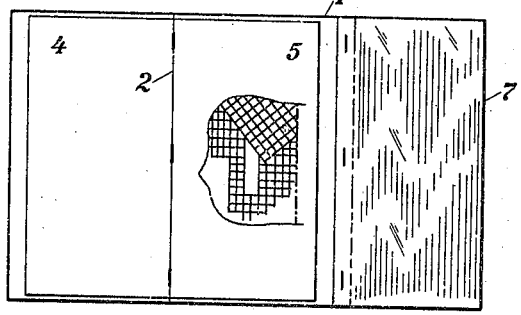
Fig. 2 is a plan view, showing the guide wide open.
Figure 3:
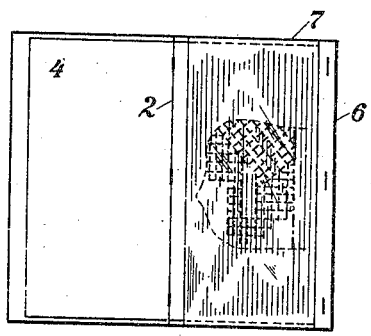
Fig. 3 is a plan view of the guide, partly open, showing the transfer sheet superposed on one of the data leaves.
Figure 4:
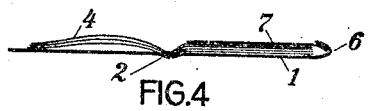
Fig. 4 is an end view of the guide in the position shown in Figure 3.

Referring to the figures of the drawings:—The back of the guide is represented by the numeral 1, and has bound at one edge thereof, as at 2, a series of data leaves 3, 4, 5, to any desired number. These leaves have thereon plans, as indicated. These plans may be skeleton maps of the city, preferably all alike, and to these skeleton maps are added information of various characters. For example, plan 3 may have thereon the transportation systems of the city, or part of them. Plan 4 may have the theatres of the city; and other plans or leaves may have other matters of interest. For simplicity, it is preferred that only one class of information be on a sheet, but more than one may be combined, where they do not conflict. The order of arrangement of the leaves may be made to suit local conditions. Preferably to the edge 6 of the back 1, opposite edge 2, I hinge a transparent sheet 7, which may be of celluloid or other material capable of receiving a mat surface on one side adapted to take and show pencil marks, and which may afterwards be erased. Thus, the sheet 7 may be entered between any two of the leaves 3, 4, 5, or folded over, or superposed on any of them, and adapted to have traced thereon any part of the data beneath. Figs. 5 to 10 inclusive, represent leaves removed from the guide and enlarged, for the purpose of making clear the prime objects of the invention.

Figure 5:
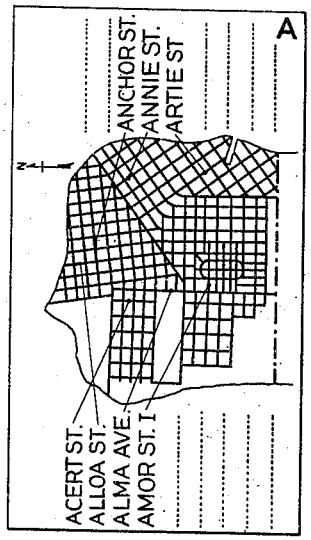
Fig. 5 is an enlarged view of one of the data leaves removed from the guide showing the skeleton map of a city thereon.

The page shown by Fig. 5 has a skeleton map of the city thereon, and along two of its margins are printed some of the street names beginning with the letter A as indicated. Each street name has a light line running therefrom which may terminate at any point on the street bearing the name.

Figure 6:
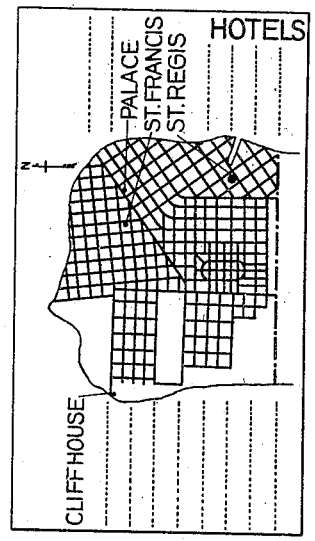
Fig. 6 is a similar view of another leaf.

In Fig. 6, this page shows a similar skeleton map with the names of a few hotels printed thereon; and similarly a light line runs from each name and terminates in a dot. The dot represents the approximate location of the respective hotel.

Figure 7:
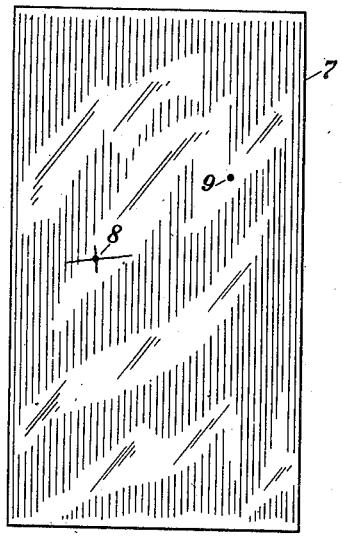
Fig. 7 is an enlarged view of the transfer sheet removed.

Fig. 7 is the transfer sheet 7 of Fig. 1, with the dulled or mat surface uppermost. On this surface have been marked two dots 8 and 9. Dot 8 is the intersection point of Alloa and Anchor Streets of Fig. 5, and dot 9 is the St. Regis Hotel of Fig. 6.

Figure 8:
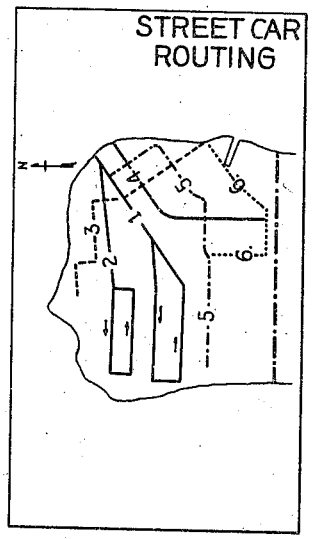
Fig. 8 is an enlarged view of a street car routing leaf removed.

Fig. 8 is a street car routing page showing six different routes on the skeleton map.

Figure 9:
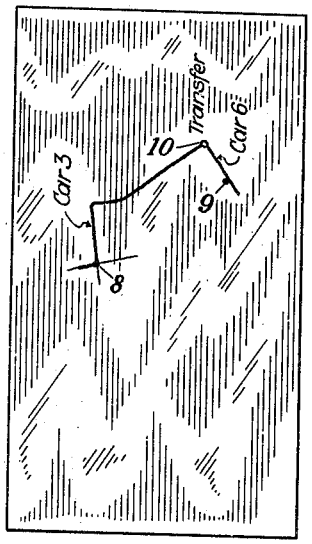
Fig. 9 is another view of the sheet of Figure 7.

Fig. 9 is the transfer sheet 7 as shown in Fig. 7, with the additional zigzag line connecting the dots 8 and 9. Part of this zigzag line represents a portion of the route of street car 3, and the remaining part a portion of car 6 route as shown. At the terminus where the cars meet, is the transfer point 10. The data shown on the sheet of Fig. 9 completes the immediate problem of the user of the guide, which problem was, being located at the moment in the vicinity of Alloa and Anchor Streets and desiring to locate and go to the St. Regis Hotel, he may first find the page A showing Alloa Street, he then superposes the transfer sheet 7 over this page and traces a portion of the said street thereon, then in a similar manner he finds Anchor Street and similarly traces a portion of this street thereon; the intersection of these two streets results in the dot 8. Next he turns to the data page showing the hotels, and lays the transfer sheet over this page and traces the dot thereon representing the St. Regis Hotel. Now he may turn to the street car routing page and lay the transfer sheet thereon which shows the two marked dots 8 and 9, the starting point and the desired destination. Looking through the translucent transfer sheet 7, the user observes the car-lines 3 and 6 offer the nearest course by this means of transportation. He then may proceed to trace on the said transfer sheet as much of the combined routing as interests him. He also may mark on the sheet the numbers of the cars he must take, the transfer point and as much other data as he desires.

For some cities, certain areas on the skeleton maps may be too congested for clarity to the ordinary user of the guide, and for such cities I may prefer to make enlargements of the said areas on the same size leaves, and bind the same with the other leaves, observing all features as to the direction of the arrow, marginal references, position of insertion, indexing and so forth.

Figure 10:
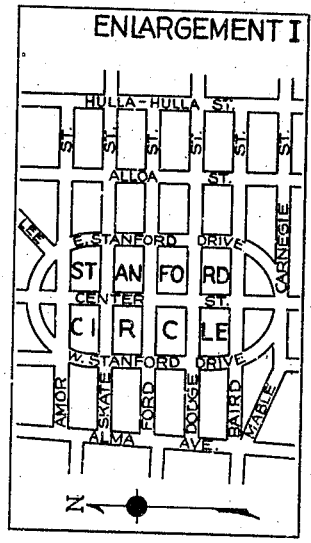
Fig. 10 is a view of one of the data leaves removed, showing a congested area enlarged for clarity.

Fig. 10 shows such an enlargement. On the skeleton map of Fig. 5 it will be observed that one end of Amor Street lies in a congested area, and this street name reads Amor Street I, the latter Roman numeral meaning, see enlargement I, for the immediate area in question. The clarity and value of such an enlargement is evident. In these enlargement cases the transfer sheet may not be used in connection therewith, but from these enlargements the point or object may be found and then approximately located on the skeleton map, and the procedure of use of the transfer sheet is then the same as in the uncongested areas.

Figure 11:
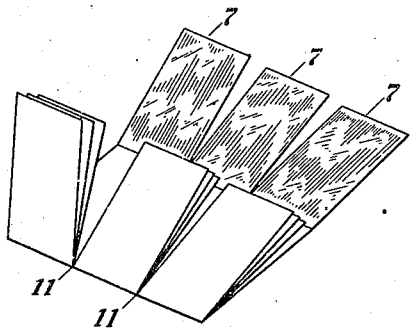
Fig. 11 shows in perspective, a modification of my invention intended for maps or plans that cover a long area compared to the width of the same.

Fig. 11 shows a modification of my invention in the form of a plurality of guides, that is, each section is approximately similar to the preferred form of my guide as shown and described, and adapted to be folded to the size of the preferred form if desired: the back cover being a single piece, creased at the folding lines 11. This or the equivalent type of modification of my guide, I prefer to use when the guide is prepared for a city that covers an area that is very long compared to its width, then the skeleton map or plan may lengthwise cover two, three or more sections, the portion of the said map or plan of each section being duplicated on the leaves of its respective section. For illustration, consider the map of Manhattan Island, New York. It may be arranged in the most convenient manner on the unfolded sections, the North arrows pointing in any direction, but, it is to be understood however, that all the duplicate maps register. The use of this modification is similar to that of the single section guide, but in this case, the three transparent sheets 7 are laid on the proper exposed pages and the information sought traced therefrom similarly as done in the single section guide.

Having described my invention and a slight modification of it, it is to be understood that I do not wish to limit myself to the precise construction and arrangement of it as shown and described herein, but wish to include all variations of the invention that come within the spirit and scope of the claims, which now follow.

I claim:

1. A city guide provided with a set of leaves, each leaf having printed thereon a skeleton map of the city in conjunction with guiding data for that particular leaf the said skeleton map being alike on each leaf, and said guide also provided with a hinged transparent transfer sheet adapted to be folded over any one of the said leaves for marking on said sheet any data desired to be transferred thereto from the leaf beneath.

2. A city guide provided with a set of leaves, each leaf having thereon a duplicate skeleton map of the city, and also provided with additional leaves, each of the latter having thereon a different enlargement of certain areas of said skeleton map, and said guide further provided with a celluloid transfer sheet separately hinged to an edge thereof, adapting the said transfer sheet to be superposed over any leaf for receiving erasable marks thereon.

3. A guide comprising a plurality of sections and a cover for said sections, the sections being substantially similar in form and arranged with their longitudinal edges in abutting relation, each section consisting of a plurality of leaves presenting duplicate skeleton maps or plans, said cover being a single piece creased at the folding line of each section, the map of one section matching that of each adjacent section, whereby to present a continuous map extending the combined width of the sections when unfolded.

4. In a guide, a set of leaves and an erasable transfer sheet; each leaf in the said set having a duplicate skeleton plan printed thereon, and the said transfer sheet adapted to be folded over any one of the said plans for the purpose set forth.

5. In a guide, a set of leaves and a transfer sheet; each leaf in the said set having thereon a duplicate skeleton plan in addition to other data, and adapted to register so that the said transfer sheet may be superposed over any one of the leaves for transferring data thereto, the resultant data on the transfer sheet being shown in true relation with respect to the said plans.

In testimony whereof I affix my signature to this specification.

HELLMUTH SCHMIDT.